United States Patent [19]

Smith

[11] Patent Number: 5,740,872
[45] Date of Patent: Apr. 21, 1998

[54] HARDFACING MATERIAL FOR ROLLING CUTTER DRILL BITS

[75] Inventor: Randolph Carl Smith, Houston, Tex.

[73] Assignee: Camco International Inc., Houston, Tex.

[21] Appl. No.: 673,978

[22] Filed: Jul. 1, 1996

[51] Int. Cl.$^6$ .................. E21B 10/52; B32B 15/02
[52] U.S. Cl. .................. 175/374; 175/307; 428/558
[58] Field of Search .................. 175/307, 374, 175/375, 405.1, 425, 435; 428/242, 413, 447, 558, 564

[56] References Cited

U.S. PATENT DOCUMENTS

| | | | |
|---|---|---|---|
| 1,757,601 | 5/1930 | Stoody et al. | |
| 3,023,130 | 2/1962 | Wasserman et al. | |
| 3,252,828 | 5/1966 | Quaas | |
| 3,800,891 | 4/1974 | White et al. | |
| 4,076,883 | 2/1978 | Dittrich et al. | 428/242 |
| 4,554,130 | 11/1985 | Ecer | 419/381 |
| 4,562,892 | 1/1986 | Ecer | 175/371 |
| 4,592,252 | 6/1986 | Ecer | 76/108 A |
| 4,630,692 | 12/1986 | Ecer | 175/330 |
| 4,699,848 | 10/1987 | Maybon | |
| 4,726,432 | 2/1988 | Scott et al. | |
| 4,741,974 | 5/1988 | Longo et al. | 428/558 |
| 4,814,234 | 3/1989 | Bird | 428/564 |
| 4,836,307 | 6/1989 | Keshavan et al. | |
| 4,944,774 | 7/1990 | Keshavan et al. | |
| 5,051,112 | 9/1991 | Keshavan et al. | |
| 5,279,374 | 1/1994 | Sievers et al. | 175/374 |

FOREIGN PATENT DOCUMENTS

| | | |
|---|---|---|
| 0246596 | 11/1987 | European Pat. Off. |
| 0323090 | 7/1989 | European Pat. Off. |
| 2590192 | 5/1987 | France |
| 3743167 | 6/1989 | Germany |

Primary Examiner—Frank Tsay

[57] ABSTRACT

A material for applying hardfacings to the teeth of steel tooth rolling cutter drill bits comprises a mixture of refractory metal carbide, such as tungsten carbide, cobalt and metallic matrix powders formed into a core structure and surrounded by a thin metallic sheath. The metallic matrix powders include iron, deoxidizers and alloy powders. The ratio by weight of the metallic matrix powders to the sheath exceeds 2.5, so that the core structure provides most of the matrix material for the hardfacing and only a small proportion of such material is provided by the thin sheath, which may have a thickness of only 0.001" to 0.010". The core structure may include an organic binder, such as methylcellulose, to provide strength and to prevent segregation of the core materials.

16 Claims, 1 Drawing Sheet

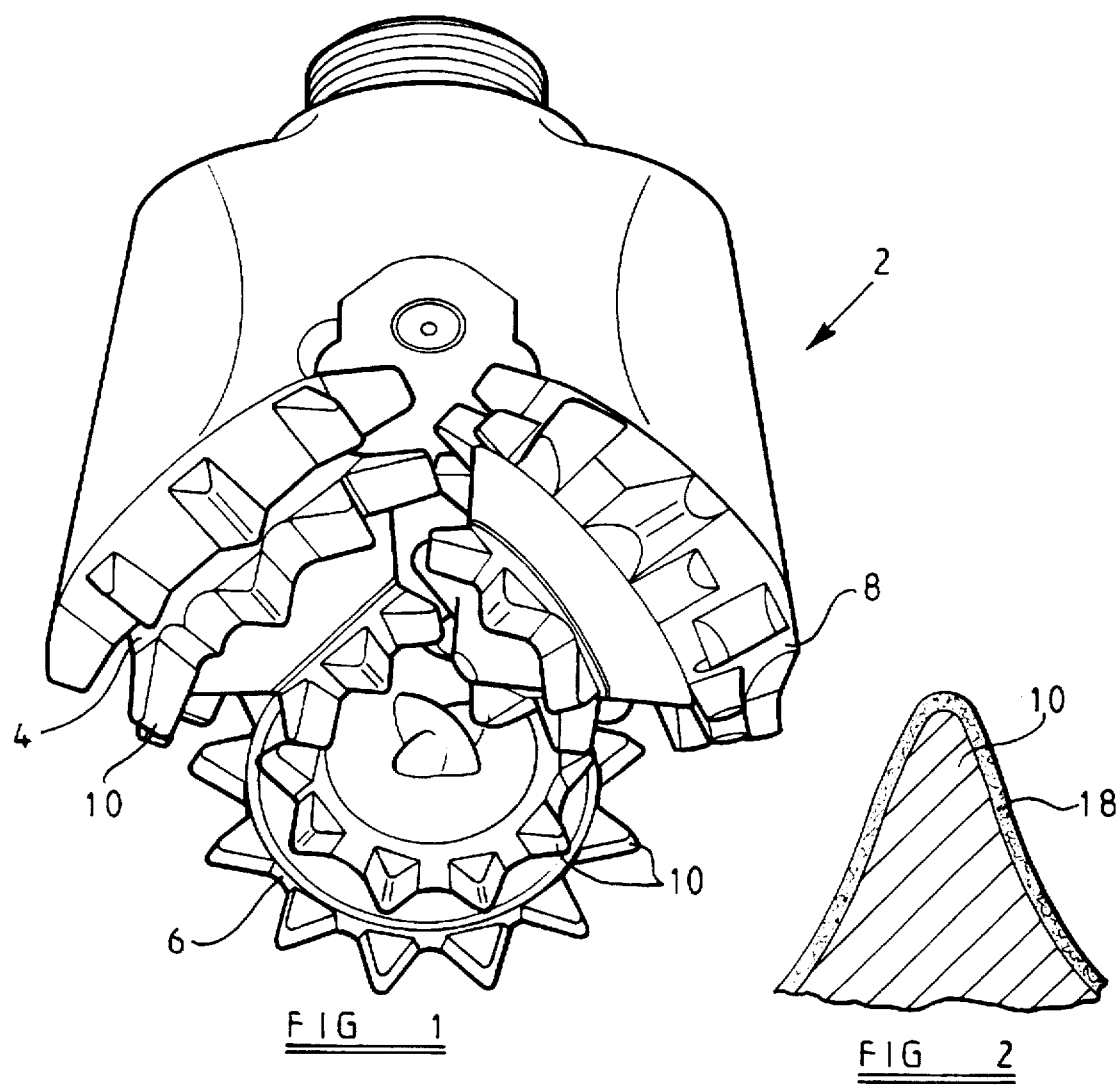
FIG 1
FIG 2
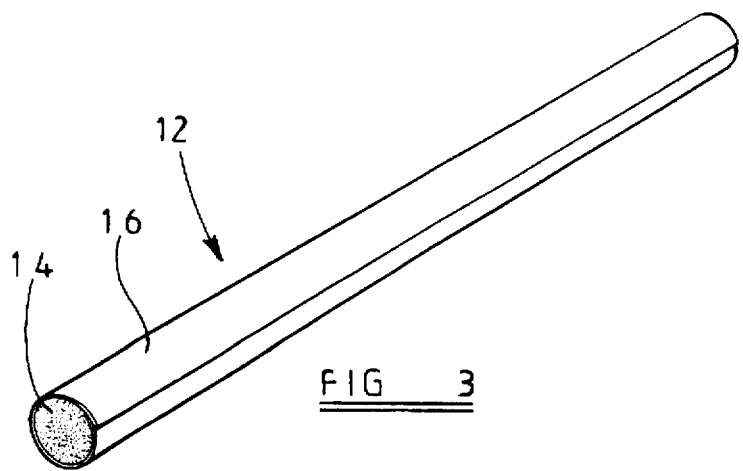
FIG 3

HARDFACING MATERIAL FOR ROLLING CUTTER DRILL BITS

BACKGROUND OF INVENTION

1. Field of the Invention

This invention relates to heat treatable hardfacings, especially as applied to steel tooth rolling cutter earth drilling bits.

2. Description of Related Art

Hardmetal overlays are employed in rock drilling bits as wear and deformation resistant cutting edges and faying surfaces. These typically comprise composite structures of hard particles in a metal matrix. The hard particles may be metal carbides, such as cast WC/W2C eutectic, monocrystalline WC, or themselves comprise a finer cemented carbide composite material such as sintered WC-Cobalt. These hardmetal overlays are formed by braze or weld deposition of composite rod, wherein the typically iron based alloy matrix solidifies from a melt containing hard particles which remain at least partially solid. This type of rod has been in use for several decades. Early examples of hardfacing rods for welding are shown in U.S. Pat. Nos. 1,757,601 and 3,023,130.

Steel tooth rolling cutter drill bits subject the hardfacing layer to extreme loads and prolonged scraping action. Therefore, the strongest, most wear resistant of fused hardmetals are used in rolling cutter drill bit cutting structures. These drill bits typically utilize sintered WC-Cobalt as the primary hard phase, and the hardfacing system is designed to maximize the size and volume fraction of hard phase. Often, a combination of hard particle types is incorporated in the materials design, and particle size distribution is manipulated to attain desired performance under rock drilling conditions, as disclosed in U.S. Pat. Nos. 3,800,891; 4,726,432; and 4,836,307. These materials are usually incorporated into a composite rod and weld deposited on critical wear portions of the drill bit teeth.

The formulation of composite rod filler material entails fabricability and processing considerations in addition to constituency selection. Typically, a tubular construction has been employed, wherein a sheath of metal, usually low carbon steel, enfolds a particulate mixture comprising hard particle phases and additives including binders and deoxidizers. Sheath metal combines with substrate melt, if any, to provide substantially all of the matrix phase of the final deposit. Because the sheath supplies between 80% and 99% of the matrix phase, the sheath thickness is 0.015" to 0.020" for ⅛" to ¼" nominal diameter composite rod. The final constituency of the hardmetal composite overlay is dependent on deposition process parameters as well as on raw material formulation.

The management of thermal inputs during hardfacing weld deposition is critical to the achievement of a sound deposit. Insufficient substrate heating or too cool composite rod melt can cause poor bonding, porosity, and irregular deposit configuration. Excess substrate heating, too high rod melt, and/or excess time at temperature produces substrate dilution and hard particle degradation. Substrate dilution reduces carbide fractions, effectively reducing the volume percentage of hardmetal present. Substrate dilutions in excess of 15% are common in these hardfacings. The effects of sintered particle degradation include particle softening and matrix embrittlement.

These effects lead to reduced wear resistance of the hardfacing and reduced ability of the hardfacing to withstand shock loads without fracture. Deposit temperature/time control becomes increasingly critical with increases in carbide loading and large application surface areas. Composite rod with over about 60 wt % carbide fill becomes problematic to weld-deposit without substrate penetration/dilution in drill bits of medium to large sizes. Deposition dynamics are strongly influenced by the thermal transfer, melting, and flow characteristics of the thick metal sheath.

One solution to this limitation is to incorporate the metal matrix component(s) of composite rod as a powder instead of a solid sheath. This approach exploits the high specific surface area of particulate material to speed melting/wetting dynamics but entails loss of the sheath as a source of structural strength in handling and loss of melt progression regulation at high temperature.

U.S. Pat. No. 5,051,112 provides for use of sintering of a powder composite rod as a means of replacing the mechanical strength of the sheath. The sintered rod of this patent imposes a strong, porous, insulating structure which has to melt before collapsing into the weld pool. Melt progression can be difficult to control with a sintered rod, often resulting in a considerable variation of the thickness and composition of the hardfacing layer.

Another approach is disclosed in U.S. Pat. No. 4,699,848; which entails incorporation of a central core wire in lieu of a sheath. The wire reinforced rod of this patent places the hard to melt solid metal core at the center of the rod, the furthest place from the heat source. The result is also relatively high temperatures at the surface of the composite rod and difficulty in controlling melt progression.

Both of these approaches provide some improvement over conventional, thick sheath tubemetal, but still sacrifice melting speed and control of melt progression. The high temperatures and long times required to melt these rods may still lead to carbide degradation and matrix embrittlement. In addition, these methods require costly additional processing steps or formulation additives to make them workable.

An additional requirement of hardfacing applicable to steel tooth drill bits is that it be heat treatable to obtain the desired strength and toughness characteristics. The high stresses on the teeth of a steel tooth drill bit cutter in operation require that the entire outer surface of the rolling cutter be carburized, hardened and then tempered. A typical result is a hardness of 50 to 57 Rc to a depth of 0.060" or more, which is most of the depth (thickness) of the hardmetal overlay.

The hardmetal layer is usually applied to the steel teeth of the cutter prior to the carburization to avoid cracking the rolling cutter body during welding. Because it is desirable to form a compressively stressed layer over the hardened tooth core, hardmetal and matrix material are carburized and hardened along with the rest of the surface of the cutter.

A common mode of hardfacing degradation in drilling service with the prior art steel tooth bits is known as "spalling" or "chipping". Spalling is characterized by loss of relatively large pieces of the hardfacing layer. Spalling entails crack propagation through the hardfacing caused by mechanical stresses from applied drilling loads. The drilling industry has learned to accept and tolerate hardfacing spalling failure as one of the limitations of steel tooth drill bits. With the advent of bits containing ever higher volume fraction tungsten carbide in their hardmetal layers, as shown in U.S. Pat. Nos. 4,836,307 and 4,944,774, spalling becomes even more pronounced.

In drill bits made in accordance with the above listed patents and in other modern steel tooth drill bits prior to the present invention, the composition and performance of the matrix of the hardfacings has been a secondary design consideration. The typical drill bit hardfacing matrix consists of a carburized iron, deoxidizing elements, tungsten and carbon from melted hard particles, and elements from the substrate steel of the cutter.

Since existing drill bit hardfacing materials have many variables affecting the application of the hardfacing layer, there is a great deal of local variation in application temperatures, hardfacing thickness and matrix composition. These variations cause uncontrolled and undesirable alloying of the matrix metal. The act of carburizing and hardening the hardfacing matrix material coupled with these variations often adversely affects local hardness and toughness of the matrix material, leading to matrix failure, spalling and premature tooth wear during bit operation.

SUMMARY OF INVENTION

The present invention provides a drill bit with a more durable hardfacing and a new hardfacing material to produce it. The present invention provides for a rapidly melting, highly controllable composite rod through the use of a thin metal sheath and a powder metal core comprising hard particles and a substantial portion of the metal matrix. Applied by the oxy-fuel welding process, it allows the rapid deposition of high carbide fraction, low porosity, hardmetal overlays on large substrates, with minimal carbide, degradation and with typically less than 5% substrate dilution. The thin sheath material allows rapid melting of both sheath and metal powders with minimal heat input, and yet provides excellent control of melt progression. The iron and alloy content of the powdered core is adjusted as sheath thickness is varied. The thin sheath thicknesses may vary from 0.001" to 0.010" although the preferred range is from 0.001" to 0.006" thickness.

The core is produced by combining the powdered metal with a plastic binder material and extruding under pressure. The core is then wrapped in a thin sheath. Although many different binder materials may be functional, organic plastic binders are preferred.

The invention also provides the major constituent of the hardfacing deposit matrix as metal powders; Iron, deoxidizers and alloys which, by weight, exceed the sheath by a minimum ratio 2.5. In the preferred embodiment the minimum ratio exceeds 5.

The significant differences of constituent densities in existing art tubemetals can lead to segregation, resulting in weld deposit inhomogeneity which develops during the handling and metering of dry powder mixtures of "thick sheath" products. In the present invention, the organic binder does not allow particulate segregation during sheathing.

Careful selection of sheath thickness, compressed powder constituency ratios, matrix alloying powder additions and rod cross sectional area are necessary to assure the proper chemistry of the final hardfacing layer.

The present invention also provides a steel tooth drill bit having a carburized and hardened hardfacing layer comprising sintered cemented refractory metal carbide primary particles with a matrix composition by weight of from 0.1% to 3% Chromium, 0.1% to 2.5% Nickel, 0.1% to 1.5% Molybdenum, 0.5% to 9% Manganese, 0.3to 2% Silicon, 0.4% to 1.3% Carbon, unavoidable impurities and Iron, wherein the volume percent of said refractory metal cemented carbide primary particles exhibiting 90 percent or more of their original hardness is at least 85 percent.

The refractory metal carbides in the hardfacing layer may include carbides of one or more of the following elements: W, Mo, Cr, Ta, Nb, and V. This range of alloying elements provides for an improved hardfacing matrix which has greatly increased toughness compared to the nearly pure iron matrix hardfacing used in prior art steel tooth drill bits.

BRIEF DESCRIPTION OF THE DRAWINGS

FIG. 1 is a perspective view of a steel tooth drill bit.

FIG. 2 is a cross section view of a tooth of a steel tooth drill bit with the hardfacing of the current invention.

FIG. 3 is a perspective view of the hardfacing material of the present invention.

DESCRIPTION OF THE INVENTION AND OF THE PREFERRED EMBODIMENT

A perspective view of a steel tooth drill bit 22 of the present invention is shown in FIG. 1. A steel tooth drill bit 2 typically has three rolling cutters 4, 6, 8 with a plurality of cutting teeth 10. Shown in FIG. 2 is a cross section view of a tooth of a steel tooth drill bit with the hardfacing of the current invention. The tooth 10 is coated with a weld applied layer of hardfacing material 18 which contains hard particles and a continuous iron alloy matrix. The hardfacing layer 18 greatly improves the abrasion resistance of the steel teeth 10 and must survive the impact and scraping loads applied during rock drilling.

Referring now to FIG. 3, thin sheathed extruded rod 12 (TSER) is an extruded core 14 of cemented carbide, macrocrystalline carbide, and cast carbide, iron powder, powdered alloys, and deoxidizer with an organic binder. Since the metallic powders in the mixture adhere to the binder, powder segregation during handling is all but eliminated.

The mixture is compressed and covered with a thin (0.001" to 0.010") sheath wrap 16. This sheath thickness range causes a ratio by weight of the metallic matrix powders (iron, deoxidizers and alloys) in the core, to the sheath, of greater than 2.5. In the preferred embodiment, the sheath 16 is from 0.002" to 0.006" thick to optimize chemistry and melting characteristics. Silicates of potassium, sodium, or combinations thereof may be used to enhance the sheath adherence on the extruded core 14.

The preferred fabrication method for the TSER rod 12 employs shear mixing the metal powders with a methylcellulose plastic binder. The powdered metal with a methylcellulose/water bound mixture is then extruded directly into a sheathing mill, where it is wrapped, cut to length and subsequently desiccated. Alternatively, the extrudate 14 may be cut to length, desiccated and sheathed in the dry state. When the product is applied to steel parts for abrasion protection by the oxy-fuel welding process, the powders and thin sheath 16 fuse rapidly to produce a relatively solute free matrix supporting minimally heat degraded carbide particles. Application control via rod stiffness is provided continuously by the thin sheath 16.

In the preferred embodiment, the core fill consists of 50.8 wt %, 20/30 mesh crushed sintered WC/Co; 8.3 wt %, 40/100 mesh macrocrystalline WC; 4.4 wt %, 40/100 mesh cast WC; 31.3 wt %, 325 mesh iron powder; 2.0 wt % stabilized electrolytic Manganese powder which is both a deoxidizer and an alloying element; 2.0 wt % silicomanganese powder which is an additional deoxidizer; and 1.2 wt % methylcellulose based binder/extrusion agent. After thorough blending and extrusion into 0.20" diameter× 28" long rods, the material is longitudinally wrapped with and bonded to a very thin (0.002") AISI 1008 annealed low carbon steel foil sheath 16. This sheath thickness range causes a ratio by weight of the metallic matrix powders (iron, deoxidizers and alloys) in the core, to the sheath, of greater than 5. The plastic binder helps to maintain uniform distribution of constituents during manufacture, handling and application.

By the use of different alloying agents in the metal powder, many different types of steels may be used as a sheath 16 material. However, low carbon steels have been found particularly effective.

TSER 12 is designed to be applied to steel substrates, typically the surfaces of drill bit teeth, by oxy-fuel welding (OFW). When oxygen-acetylene is utilized, flame temperature and reducing characteristics are established through various gas flows with a slightly oxygen reducing (excess acetylene) flame adjustment. Oxygen consumption and application rates vary directly with tooth surface area and have been evaluated for $\frac{1}{32}$ sq. in. to 4 sq. in. surfaces, with oxygen flows varying from 11 to 40 CFH, respectively. Application rates varying from 0.6 to 1.3 lbs/hr. have been observed when applying the preferred embodiment, depending upon fuel flows and tooth geometry constraints. The ability to produce high quality deposits at such rates on such a range of substrates is very problematic using the prior art. The preferred embodiment results in deposits wherein average thickness may be varied from approximately 0.06" to 0.20" and higher.

The drill bit cutters are carburized, hardened and tempered after weld application of the hardfacing 18. The heat-treated hardfacing 18 deposits exhibit well-preserved cemented tungsten carbide particles as a primary constituent, which retain 90% or more of their original hardness, with monocrystalline and cast WC/WC as secondary phases. Total deposit carbide volume fractions of about 57% are typical, with porosity volume fractions less than 1%. The fraction of the sintered tungsten carbide particles in the deposit with greater than or equal to 90% hardness retention is greater than 84% even on large substrates, and often exceeds 94%. Tungsten carbide particle distribution is uniform, allowing hardfacing optimizations via site and shape control.

The continuous iron alloy matrix exhibits the necessary hardness, approximately 800 DPH, and toughness levels (for drill bit service) through Cr—Ni—Mn—Si alloying powders contained within the extruded TSER core 14. Tailoring of matrix properties by core powder additions or sheath alloy modifications is straightforward. These property and application advantages result from the minimization of the time that the materials spend in the high temperature, molten state between rod 12 and deposit. This is a direct advantage of using a powdered (but not sintered) core 14 with a very thin sheath 16, and OFW application, which does not gouge the substrate and provides well controlled deposition and cooling.

Using the TSER 12 hardfacing material a steel tooth drill bit cutter after heat treatment has a hardfacing 18 with primary sintered cemented carbide particles in a continuous iron alloy matrix. The matrix has less than 5% substrate dilution and a composition by weight of from 0.1% to 3% Chromium, 0.1% to 2.5% Nickel, 0.1% to 1.5% Molybdenum, 0.5% to 9% Manganese, 0.3% to 2% Silicon, 0.4% to 1.3% Carbon, unavoidable impurities and Iron.

The volume percent of the cemented carbide primary particles exhibiting 90 percent or more of their original hardness is at least 85 percent. These carbide primary particles can be comprised of one or more carbides of the elements W, Mo, Cr, Ta, Nb, and V. The matrix alloy provides for a hardfacing matrix which has greatly increased toughness, and the high hardness retention of the primary carbides provides for greater wear resistance compared to prior art steel tooth drill bits.

Furthermore, a steel tooth drill bit cutter made with the preferred embodiment of the TSER material 12 has a hardfacing 18 comprising primary sintered cemented tungsten carbide particles and a matrix alloy; a carburized surface layer of said hardfacing having an iron matrix alloy composition by weight of from 0.1% to 1% Chromium, 0.1% to 2.0% Nickel, 0.1% to 0.75% Molybdenum, 1.5% to 7% Manganese, 0.7% to 1.5% Silicon, 0.7% to 0.9% Carbon, unavoidable impurities and iron, wherein the volume percent of said cemented carbide primary particles exhibiting 90 percent or more of their original hardness is at least 85 percent.

Because a drill bit made with the TSER hardfacing rod 12 of the present invention has a more consistent layer thickness compared with prior art steel tooth drill bits and typically less than 5% substrate dilution, the benefits of alloying the hardfacing 18 are synergistically increased.

Whereas the present invention has been described in particular relation to the drawings attached hereto, it should be understood that other and further modifications, apart from those shown or suggested herein, may be made within the scope and spirit of the present invention.

What is claimed:

1. A hardfacing material comprising a mixture including refractory metal carbide, cobalt, and metallic matrix powders formed into a core structure and surrounded by a metallic sheath, wherein the ratio by weight of said metallic matrix powders to said sheath exceeds 2.5.

2. A hardfacing material according to claim 1, wherein the ratio by weight of said metallic matrix powders to said sheath exceeds 5.

3. A hardfacing material according to claim 1, wherein said sheath has a thickness of from 0.001" to 0.010".

4. A hardfacing material according to claim 3, wherein said sheath has a thickness of from 0.001" to 0.006".

5. A hardfacing material according to claim 1, wherein said metallic matrix powders include iron, deoxidizers and alloy powders.

6. A hardfacing material according to claim 1, wherein said refractory metal carbide includes carbides of at least one of the elements W, Mo, Cr, Ta, Nb and V.

7. A hardfacing material according to claim 1, wherein said refractory metal carbide is tungsten carbide.

8. A hardfacing material according to claim 1, wherein the core structure includes an organic binder.

9. A hardfacing material according to claim 8, wherein the organic binder is methyl cellulose.

10. A hardfacing material according to claim 1, wherein the core structure is produced by extrusion and desiccation.

11. A hardfacing material comprising a mixture of refractory metal carbide, cobalt, and metal powders formed into a core structure and surrounded by a metallic sheath, wherein the distribution of the powders and the strength of the core structure is maintained by the incorporation of an organic binder.

12. A hardfacing material according to claim 11, wherein the organic binder is methyl cellulose.

13. A hardfacing material according to claim 11, wherein said refractory metal carbide includes carbides of at least one of the elements W, Mo, Cr, Ta, Nb and V.

14. A rolling cutter earth boring bit with a rolling cutter cone having cutting teeth, a tooth on said cone having a hardfacing comprising primary sintered cemented refractory metal carbide particles and a matrix alloy; a carburized surface layer having an iron matrix alloy composition by weight of from 0.1% to 3% Chromium, 0.1& to 2.5% Nickel, 0.1% to 1.5% Molybdenum, 0.5% to 9% Manganese, 0.3% to 2% Silicon, 0.4% to 1.3% Carbon, unavoidable impurities and iron, wherein the volume percent of said cemented refractory metal carbide particles exhibiting at least 90% of their original hardness is at least 85%.

15. A rolling cutter bit according to claim 14, wherein said refractory metal carbide includes carbides of at least one of the elements W, Mo, Cr, Ta, Nb and V.

16. A rolling cutter bit according to claim 14, wherein said refractory metal carbide is tungsten carbide.

* * * * *